US012496249B2

(12) United States Patent
Herrguth

(10) Patent No.: US 12,496,249 B2
(45) Date of Patent: Dec. 16, 2025

(54) SEX TOY AS VIBRATOR FOR EROGENOUS STIMULATION, METHOD, AND USE

(71) Applicant: Jens Herrguth, Alfeld/Leine (DE)

(72) Inventor: Jens Herrguth, Alfeld/Leine (DE)

(73) Assignees: R+H SPÓLKA Z OGRANICZONA, Gdansk (PL); ODPOWIEDZIALNOSCIA, Gdansk (PL); INNOVISION SPÓLKA JAWNA, Gdansk (PL)

( * ) Notice: Subject to any disclaimer, the term of this patent is extended or adjusted under 35 U.S.C. 154(b) by 1078 days.

(21) Appl. No.: 17/157,442

(22) Filed: Jan. 25, 2021

(65) Prior Publication Data

US 2022/0233394 A1 Jul. 28, 2022

(51) Int. Cl.
*A61H 19/00* (2006.01)
*A61H 23/02* (2006.01)

(52) U.S. Cl.
CPC ......... *A61H 19/30* (2013.01); *A61H 23/0263* (2013.01); *A61H 2023/0281* (2013.01); *A61H 2201/1215* (2013.01); *A61H 2201/5023* (2013.01)

(58) Field of Classification Search
CPC ........ A61H 19/00; A61H 19/30; A61H 19/34; A61H 19/40; A61H 19/44; A61H 19/50; A61H 23/02; A61H 23/0254; A61H 23/0263; A61H 23/00; A61H 23/004; A61H 23/006; A61H 23/008; A61H 23/029; A61H 2023/002
See application file for complete search history.

(56) References Cited

U.S. PATENT DOCUMENTS

| | | | | |
|---|---|---|---|---|
| 8,545,392 B2 | 10/2013 | Standfest et al. | |
| 9,114,056 B2 | 8/2015 | Imboden et al. | |
| 9,393,175 B2 | 7/2016 | Topolovac et al. | |
| 10,940,078 B1 * | 3/2021 | Lee | A61H 19/34 |
| 2003/0009116 A1 * | 1/2003 | Luettgen | A61H 19/34 601/72 |
| 2012/0123199 A1 | 5/2012 | Topoloev | |
| 2012/0136287 A1 | 5/2012 | Barnard et al. | |

(Continued)

FOREIGN PATENT DOCUMENTS

| | | |
|---|---|---|
| CN | 208541223 U | 2/2019 |
| DE | 102018107939 A1 | 10/2019 |

(Continued)

OTHER PUBLICATIONS

DCX 14 L B14 mm, precious metal brushes, DC motor, Maxon Catalogue, Apr. 2024.

(Continued)

*Primary Examiner* — Carrie R Dorna
(74) *Attorney, Agent, or Firm* — Fresh IP PLC; Terrence L.B. Brown

(57) ABSTRACT

Sex toy as a vibrator for erogenous stimulation, including an electric motor drive that rotationally drives at least one eccentric inertial mass. The inertial mass eccentrically rotates in a rotational frequency range, and therefore the vibrator vibrates in this frequency range and thus in its working oscillation frequency range. The diameter of the motor drive is between 5 mm and 50 mm. The vibrator is designed in such a way that during operation it is virtually acoustically imperceptible.

22 Claims, 2 Drawing Sheets

(56) References Cited

U.S. PATENT DOCUMENTS

Figure 1:
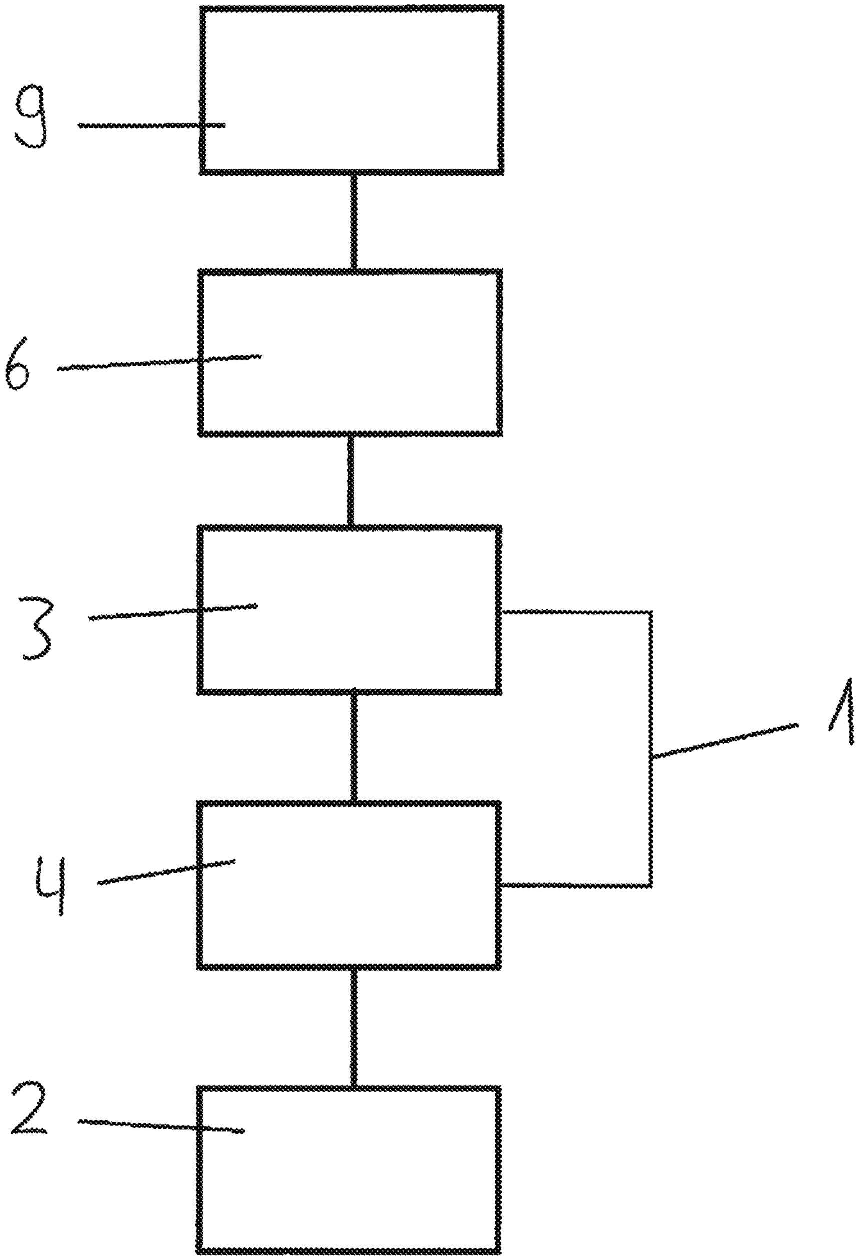

| | | | | |
|---|---|---|---|---|
| 2012/0330201 | A1* | 12/2012 | Turner | A61H 19/40 601/46 |
| 2014/0012167 | A1* | 1/2014 | DeVlieger | A61H 23/0218 601/111 |
| 2014/0357944 | A1 | 12/2014 | Spietz | |
| 2015/0335520 | A1* | 11/2015 | Dills | A61H 19/30 601/46 |
| 2016/0015596 | A1 | 1/2016 | Murison | |
| 2016/0118640 | A1* | 4/2016 | Miyake | H01M 50/553 429/163 |
| 2020/0281808 | A1* | 9/2020 | Kirsten | A61H 9/005 |

FOREIGN PATENT DOCUMENTS

| | | | | | |
|---|---|---|---|---|---|
| DE | 102021101450 | B3 | | 1/2022 | |
| EP | 4205719 | B1 | | 7/2023 | |
| RU | 2020912 | C1 | | 10/1994 | |
| RU | 2008141319 | A | | 4/2010 | |
| RU | 2541045 | C1 | | 2/2015 | |
| WO | WO 2013/086922 | | * | 6/2013 | A61H 35/00 |
| WO | WO 2018/002200 | | * | 1/2018 | A61H 23/0263 |
| WO | 2022156849 | A2 | | 7/2022 | |

OTHER PUBLICATIONS

Search Report for International Patent Application PCT/DE2022/000005, mailed on Sep. 6, 2022, 10 pages.
First Examination Report dated Mar. 11, 2025, issued in Russian patent application 2023120177, 9 pages.
Examination Report dated Feb. 5, 2025, issued in European patent application 22708287.2, 6 pages.
First Examination Report dated Jul. 29, 2025, issued in Japanese patent application 2023-544683, 6 pages.
Intention to Grant dated Aug. 22, 2025, issued in European patent application 22708287.2, 24 pages.

* cited by examiner

SEX TOY AS VIBRATOR FOR EROGENOUS STIMULATION, METHOD, AND USE

The invention relates to a sex toy as a vibrator for erogenous stimulation, a method, and use.

A large number of different embodiments of sex toys as vibrators for erogenous stimulation are known from the prior art, many having an electric motor drive, usually a brush electric motor, that drives an eccentrically rotating inertial mass, so that the vibrator or the walls of such a vibrator vibrate(s) in a customary frequency range starting at 80-120 Hz and higher, and as a result, the rotational oscillation frequency of the inertial mass also essentially corresponds to this working oscillation frequency of the vibrator. However, these vibrators known from this field of the prior art generate a very large quantity and volume of noises and sounds which are perceived as extremely objectionable and unpleasant during use of such a vibrator, and which may thus result in acoustic and sensory irritations.

The object of the present invention, therefore, is to minimize, and in the ideal case avoid, the above-mentioned irritations.

This object is achieved according to the invention by a sex toy, a method, and use.

The sex toy as a vibrator for erogenous stimulation has an electric motor drive, for example and in particular a brush electric motor (DC motor) having a conventional design, generally without a reduction gear. The motor via its shaft drives an inertial mass that eccentrically rotates in a rotational frequency range, as the result of which the vibrator (in the following discussion, the terms "sex toy" and "vibrator" are understood essentially as synonymous) vibrates in this frequency range, and thus in its working oscillation frequency range, the diameter of the motor drive being between 5 m and 50 mm. The vibrator is designed in such a way that A.) the working oscillation frequency is in a range off=10-40 Hz; and/or B.) the rotational speed constant of the electric motor drive at a minimum drive voltage of 1 volt is in the range of 600 rpm/volt to 2, 400 rpm/volt, while the rotational speed constant at a maximum drive voltage of 10 volts is in the range of 60 rpm/volt to 240 rpm/volt; for all drive voltages in between, the particular product of the drive voltage and the rotational speed constant in the drive voltage range of 1 volt to 10 volts results in rotational speeds of 600 rpm to 2,400 rpm; and/or C.) the torque constant of the electric motor drive is in the range of aa.) 0.001 mNm/A or 0.01 mNm/A or 0.1 mNm/A or 1.0 mNm/A or 10 mNm/A to bb.) 10 mNm/A or 20 mNm/A or 30 mNm/A or 40 mNm/A or 50 mNm/A.

Also essential to the invention is the fact that in these very small electric motor drives having a diameter of only approximately 5 mm to approximately 50 mm, use is made of the frequency-dependent difference between the sound pressure level (units: dB) and the volume perceived by humans (units: phon), and therefore the motors run in this very low-frequency range of 10 Hz to 40 Hz, and depending on the application, the voltage-dependent rotational speed constant and/or the current-dependent torque constant of the particular electric motor drive used (i.e., of the electric motor) is/are also appropriately dimensioned for a suitable vibration intensity. The invention is based on analogous considerations with regard to the so-called aurally compensated volume. The term "aurally compensated volume" describes how sound recordings are reproduced in such a way that in humans a similar auditory impression results at different volumes (according to Fletcher-Munson, 1933). When an assumed pure tone off=90 Hz is compared to a pure tone in a range off 10-40 Hz, for a volume level in the range of approximately 3 phon to approximately 80 phon the difference in the sound pressure levels is approximately 10 dB to approximately 60 dB; the difference in the sound pressure levels becomes smaller with increasing volume level, and the difference in the sound pressure levels increases with an increasing frequency difference. In other words, at the same sound pressure level, at an absolute volume in the range of approximately 3-80 phon, the motor running in a frequency range f=10-40 Hz is perceived to be softer by 10-60 phon (measure of volume) compared to a motor running at f=90 Hz. The vibration of the sex toy (vibrator) according to the invention, perceived as very soft, occurs essentially due to the effect explained above; this desired effect is also easily increased due to the volume level dependency of the increasingly greater difference between the volume level (units: phon) and the loudness (units: sone) for the low volume level.

However, depending on the embodiment, it is likewise conceivable for the eccentric inertial mass to extend beyond the diameter of the electric motor drive. The electric motor drives thus run in a frequency range of 10-40 Hz instead of the customary range of at least 80-120 Hz; in almost all cases in the prior art, the electric motor drives are made up of an electric motor and a reduction gear, the motors running at relatively high frequencies, typically between 300 and 600 Hz, and a vibration then resulting in the range between at least 80 Hz-120 Hz and higher due to the reduction. The electric motors usually run with a working voltage of only a few volts, advantageously around 3 volts.

These very specific dimensions of the electric motor drive according to the invention, which for the above-stated diameters has a rotation weight at its shaft in the range of typically 5 grams to 30 grams, in this very low-frequency frequency range result in advantageous vibrators in this very specific field of sex toys that are perceived as particularly soft.

In this context, it has also been necessary to overcome the belief, prevailing for decades, that the stimulating effects are not established until at least 80-120 Hz.

In this regard, it has proven successful, and has thus turned out to be advantageous, that the working oscillation frequency is in one of the following ranges: f=15-40 Hz, 20-40 Hz, 25-40 Hz, 30-40 Hz, 35-40 Hz, 10-35 Hz, 10-30 Hz, 10-25 Hz, 10-20 Hz, 10-15 Hz, 15-35 Hz, 15-30 Hz, 15-25 Hz, 15-20 Hz, 20-35 Hz, 20-30 Hz, 20-25 Hz, 25 Hz-35 Hz, 25-30 Hz, 30-35 Hz.

To avoid further unnecessary noise, it is advantageous, based on the proven success, for the electric motor drive to be free of a reduction gear.

To reduce further noise that may occur, for example due to the imbalance at the shaft of the electric motor, it is advantageous, based on the proven success, for a first enclosure to be situated inside the sex toy in the region of the inertial mass, as the result of which possibly occurring sounds and noises may be emitted to the outside with less intensity.

Accordingly, it is advantageous, based on the proven success, for the electric motor drive to be enclosed.

In addition, it is advantageous, based on the proven success, to provide a control and/or regulation electronics system that controls and/or regulates the electric motor drive, and that ensures stable and reliable running of the electric motor when appropriately used.

In this context, it is also advantageous, based on the proven success, for the control and/or regulation electronics system to have a second enclosure for reduction of interfering noise.

The above-stated enclosures may be in metallic, ceramic, or polymeric (plastics) form.

To increase the stimulation immersivity, it is advantageous, based on the proven success, for at least one vibration transmission element to be situated in or at a wall of the sex toy, the natural resonance of the vibration transmission element corresponding to the working oscillation frequency or being in the working oscillation frequency range.

In practice, it has proven successful, and is thus advantageous, for the vibration transmission element to have a tongue-shaped design.

In practice, the following embodiments have proven suitable and are thus advantageous:

The drive voltage is in the range of 1-5 volts or 1-3 volts or 3-5 volts. The control and/or regulation electronics system, which is generally designed as a PWD controller/regulator, is operated via a full bridge. The full bridge is operated via a DC-DC converter in order to slightly increase the, generally using a battery having a few volts, to achieve smooth operation. The control and regulation electronics system is programmed in such a way that at least one vibration program is retrieved or retrievable during operation, from a temporal standpoint at least one oscillation phase and at least one non-oscillation phase being provided; this is the basis for vibration programs in which oscillation phases are interrupted by rest phases in order to prevent overstimulation or provide variation in the individual case.

In this context it is advantageous, based on the proven success, for the control and/or regulation electronics system to be configured in such a way that at least 0.5 seconds and at most 3 seconds are required for powering up to the desired rotational frequency of the eccentric inertial mass, from the non-oscillation phase into the oscillation phase. In this context it is also advantageous, based on the proven success, that at least 0.5 seconds and at most 3 seconds are required for powering down from the desired rotational frequency of the eccentric inertial mass, from the oscillation phase into the non-oscillation phase. Furthermore, in this context it is advantageous, based on the proven success, when the control and/or regulation electronics system is designed in such a way that it ramps up the drive voltage above the actual drive voltage to ensure powering up of the eccentric inertial mass to the desired working oscillation frequency in a time window of at least 0.5 seconds and at most 3 seconds, in order to subsequently reduce the working voltage to the actual drive voltage.

In addition, in this context it is also advantageous, based on the proven success, when the control and/or regulation electronics system is designed in such a way that it brings the electric motor drive to a complete stop, during operation of the electric motor drive in its working oscillation frequency, in at least 0.5 seconds and at most 3 seconds by feeding a reverse-polarized current.

The sex toy has a control portion, usually formed as a type of handle, and a vibration portion, designed as a material-reduced region, for example, that is connected via an elastic intermediate portion. To reduce or even prevent numbness, it is advantageous when a vibration damping element, for example and in particular a honeycomb-shaped grid element that is mounted at an inner wall of the sex toy, is situated inside the control portion. To increase the generation of vibrations, it may be advantageous when the electric motor drive is designed as a double motor (in principle, a double motor is understood to mean two individual motors that are supplied with power either in series or in parallel) that includes a shaft that rotationally drives at least the one inertial mass, as a double motor that includes two shafts, each of which drives at least the one inertial mass, or as a simple motor that includes two shafts, each of which drives at least the one inertial mass. For supplying power, it has proven suitable for the power source to be a battery, in particular a Li-ion battery.

Lastly, the following is claimed: a method for operating a sex toy as a vibrator for generating vibrations, characterized in that a sex toy according to the invention is used; and use of a sex toy as a vibrator for generating vibrations, characterized in that it is a sex toy according to the invention.

Figure 2:
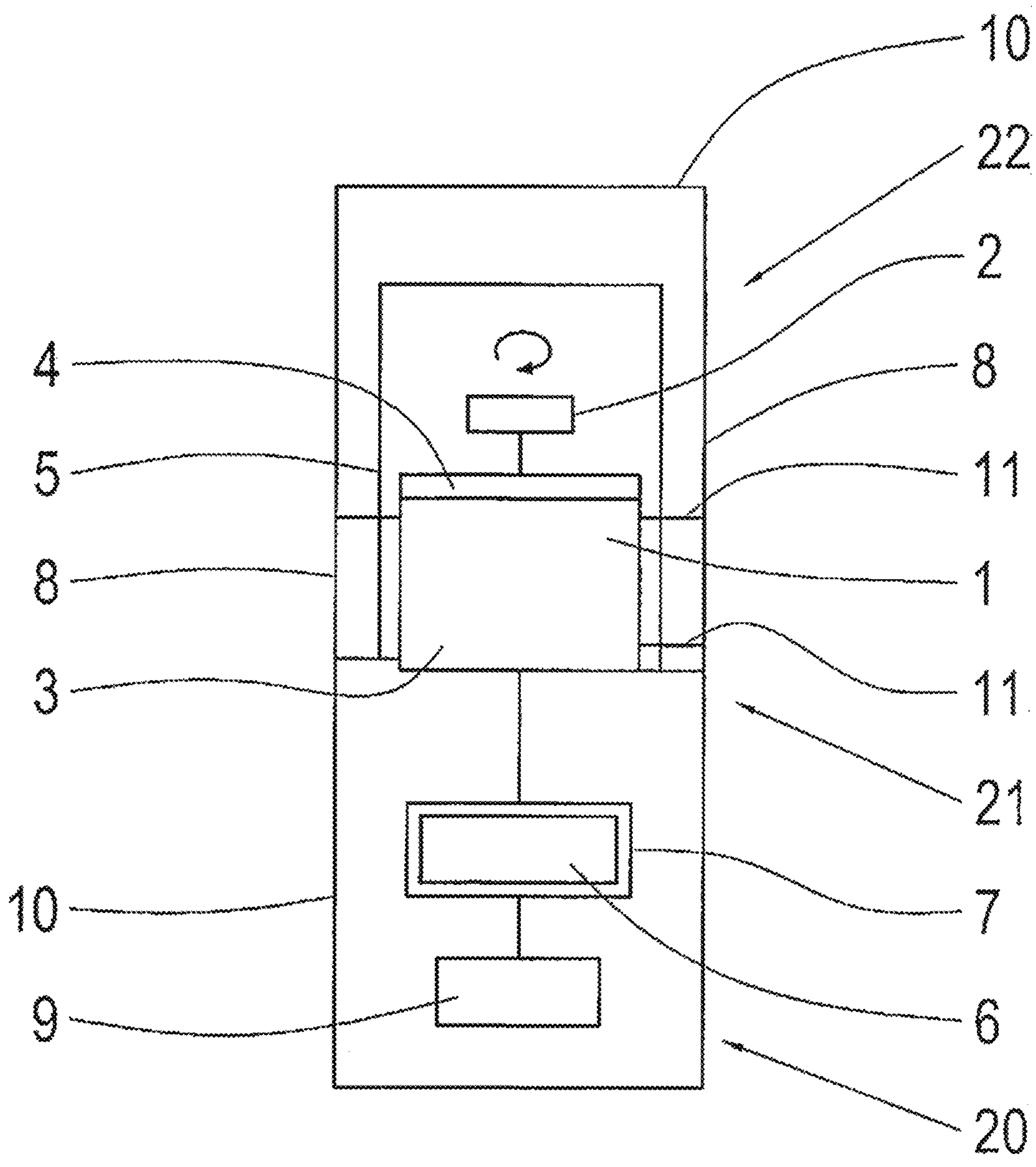

The following FIGS. 1 and 2 explain the invention by way of example and in a non-limiting manner, wherein FIG. 1 schematically illustrates the functional and formal structure of the sex toy/vibrator according to the invention, and FIG. 2 schematically illustrates a cross section of one embodiment of a sex toy/vibrator according to the invention.

One embodiment of a sex toy according to the invention as a vibrator for erogenous stimulation is presented, including an electric motor drive 1, 3 that rotationally drives at least one eccentric inertial mass 2, wherein the inertial mass eccentrically rotates in a rotational frequency range, and therefore the vibrator vibrates in this frequency range and thus in its working oscillation frequency range, the diameter of the electric motor drive 1, 3 being between 5 mm and 50 mm, and the vibrator being designed in such a way that the working oscillation frequency range is f=10-40 Hz;

and/or at a minimum drive voltage of 1 volt, the rotational speed constant of the electric motor drive is in the range of 600 rpm/volt to 2, 400 rpm/volt, while at a maximum drive voltage of 10 volts, the rotational speed constant is in the range of 60 rpm/volt to 240 rpm/volt; for all drive voltages in between, the particular product of the drive voltage and the rotational speed constant in the drive voltage range of 1 volt to 10 volts results in rotational speeds of 600 rpm to 2, 400 rpm; and/or the torque constant of the electric motor drive is in the range of 0.001 mNrn/A to 50 mNm/A or from 0.001 mNm/A to 30 mNm/A or from 0.01 mNm/A to 50 mNm/A or from 0.01 mNm/A to 30 mNm/A or from 0.1 mNm/A to 50 mNm/A or from 0.1 mNm/A to 30 mNm/A or from 1.0 mNm/A to 50 mNm/A or from 1.0 mNm/A to 30 mNm/A or from 10 mNm/A to 50 mNm/A or from 10 mNm/A to 30 mNm/A.

The vibrator has a working vibration range of 10-40 Hz, i.e., vibrates in this range, the electric motor drive 1, 3 (reference numeral 3 denotes the electric motor as such) in this case having a reduction gear 4 (in the present case, the electric motor 3 and the reduction gear 4 form the electric motor drive 1), so that the electric motor drive 1 runs at 40 Hz, for example, so that for a reduction of 2:1 the inertial mass 2 rotates eccentrically at 20 Hz and thus generates a vibration frequency of 20 Hz.

A first enclosure 5 which at the same time (acoustically) encapsulates the electric motor drive 1, 3 is situated inside the sex toy in the region of the inertial mass 2.

In addition, a control and/or regulation electronics system 6 that controls and/or regulates the electric motor drive 1, 3 is provided, the control and/or regulation electronics system having a second (acoustic) enclosure 7.

Moreover, at least one vibration transmission element 8 that has its natural resonance in the working oscillation frequency range is situated in or at a wall 10 of the sex toy, and has a tongue-shaped design and a metallic form.

The drive voltage is in the range of 3-5 volts; more precisely, the electric motor drive 1, 3 is operated at approximately 3.3 volts.

The control and/or regulation electronics system 6 is operated via a full bridge, the full bridge being operated via a DC-DC converter, and the control and/or regulation electronics system 6 being operated at approximately 5 volts.

The control and regulation electronics system 6 is programmed in such a way that at least one vibration program is retrieved or retrievable during operation, from a temporal standpoint at least one oscillation phase and at least one non-oscillation phase being provided. The vibrator (sex toy) has a control portion 20, and a vibration portion 22 that is connected via an elastic intermediate portion 21. Situated inside the control portion 20 is a vibration damping element that has a mesh-like design with a honeycomb structure and rests tightly against an inner wall 10.

The electric motor drive 1, 3 is rigidly connected to the inner wall 10 via bridge elements 11, so that the vibrations are directly transmitted to the vibration portion 22, so that with the aid of the elastic intermediate portion 21 as a material reduction of the vibration portion 22, the vibration portion can vibrate in relation to the relatively rigid control portion 20.

The power source 9 is a battery, namely, a Li-ion battery; the drive voltage is 3.3 volts.

The invention claimed is:

1. Sex toy as a vibrator for erogenous stimulation of a body part, comprising an electric motor drive free of a reduction gear that rotationally drives an eccentric inertial mass, wherein the inertial mass eccentrically rotates at a rotation frequency in a rotational frequency range, so that vibration at this rotation frequency is transmitted to an outer wall of the vibrator, so that the outer wall of the vibrator vibrates at the rotation frequency and thus the vibrator vibrates at its working oscillation frequency in its working oscillation frequency range, wherein the vibrator is configured to contact the body part and move the contacted body part in all circumferential directions, wherein the diameter of the motor drive is between 5 mm and 50 mm, and the vibrator is designed in such a way that a) the working oscillation frequency is in a range of f=10-40 Hz;

and b) a torque constant of the electric motor drive is in the range of aa.) 0.001 mNm/A or 0.01 mNm/A or 0.1 mNm/A or 1.0 mNm/A or 10 mNm/A to bb.) 10 mNm/A or 20 mNm/A or 30 mNm/A or 40 mNm/A or 50 mNm/A.

2. Sex toy according to claim 1, wherein:

the working oscillation frequency is in one of the following ranges f=15-40 Hz, 20-40 Hz, 25-40 Hz, 30-40 Hz, 35-40 Hz, 10-35 Hz, 10-30 Hz, 10-25 Hz, 10-20 Hz, 10-15 Hz, 15-35 Hz, 15-30 Hz, 15-25 Hz, 15-20 Hz, 20-35 Hz, 20-30 Hz, 20-25 Hz, 25-35 Hz, 25-30 Hz, or 30-35 Hz.

3. Sex toy according to claim 1, wherein:

a first enclosure is situated inside the sex toy in the region of the inertial mass.

4. Sex toy according to claim 1, wherein:

the electric motor drive is enclosed in a first enclosure situated inside the sex toy in the region of the inertial mass.

5. Sex toy according to claim 4, wherein:

control and/or regulation electronics system has a second enclosure.

6. Sex toy according to claim 1, wherein:

the control and/or regulation electronics system that controls and/or regulates the electric motor drive is provided.

7. Sex toy according to claim 6, wherein:

the control and/or regulation electronics system is operated via a full bridge.

8. Sex toy according to claim 6, wherein:

the full bridge is operated via a DC-DC converter.

9. Sex toy according to claim 1, wherein:

a vibration transmission element is situated in or at a wall of the sex toy, the natural resonance of the vibration transmission element corresponding to the working oscillation frequency or being in the working oscillation frequency range.

10. Sex toy according to claim 9, wherein:

the vibration transmission element has a tongue-shaped design.

11. Sex toy according to claim 1, wherein:

the drive voltage is in the range of 1-5 volts or 1-3 volts or 3-5 volts.

12. Sex toy according to claim 1, wherein:

control and/or regulation electronics system is programmed in such a way that at least one vibration program is retrieved or retrievable during operation, from a temporal standpoint at least one oscillation phase and at least one non-oscillation phase being provided.

13. Sex toy according to claim 12, wherein:

the control and/or regulation electronics system is configured in such a way that at least 0.5 seconds and at most 3 seconds are required for powering up to the desired rotational frequency of the eccentric inertial mass, from the non-oscillation phase into the oscillation phase.

14. Sex toy according to claim 12, wherein:

at least 0.5 seconds and at most 3 seconds are required for powering down from the desired rotational frequency of the eccentric inertial mass, from the oscillation phase into the non-oscillation phase.

15. Sex toy according to claim 1, wherein:

control and/or regulation electronics system is designed in such a way that it ramps up the drive voltage above an actual drive voltage to ensure powering up of the eccentric inertial mass to a desired working oscillation frequency in a time window of at least 0.5 seconds and at most 3 seconds, in order to subsequently reduce the working voltage to the actual drive voltage.

16. Sex toy according to claim 1, wherein:

control and/or regulation electronics system is designed in such a way that it brings the electric motor drive, to a complete stop, during operation of the electric motor drive in its working oscillation frequency, in at least 0.5 seconds and at most 3 seconds by feeding a reverse-polarized current.

17. Sex toy according to claim 1, wherein:

the sex toy has a control portion, and a vibration portion that is connected via an elastic intermediate portion.

18. Sex toy according to claim 17, wherein:

a vibration damping element is situated inside the control portion.

19. Sex toy according to claim 1, wherein:

the electric motor drive includes a shaft that rotationally drives at least the one inertial mass, or includes two shafts, each of which drives at least the one inertial mass, or includes two shafts, each of which drives at least the one inertial mass.

20. Sex toy according to claim 1, wherein:
the power source is a battery.

21. Sex toy according to claim 20, wherein:
the battery is a Li-ion battery.

22. Sex toy according to claim 1, wherein the rotational speed constant of the electric motor drive at a minimum drive voltage of 1 volt is in the range of 600 rpm/volt to 2,400 rpm/volt, while the rotational speed constant at a maximum drive voltage of 10 volts is in the range of 60 rpm/volt to 240 rpm/volt, wherein for all drive voltages in between, the particular product of the drive voltage and the rotational speed constant in the drive voltage range of 1 volt to 10 volts results in rotational speeds of 600 rpm to 2,400 rpm.

* * * * *